(12) United States Patent
Agashe et al.

(10) Patent No.: US 7,773,506 B2
(45) Date of Patent: Aug. 10, 2010

(54) METHOD AND APPARATUS FOR DATA COMMUNICATIONS OVER MULTIPLE CHANNELS

(75) Inventors: Parag Arun Agashe, San Diego, CA (US); Ramin Rezaiifar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 9 days.

(21) Appl. No.: 10/961,891

(22) Filed: Oct. 7, 2004

(65) Prior Publication Data

US 2005/0078653 A1 Apr. 14, 2005

Related U.S. Application Data

(60) Provisional application No. 60/511,275, filed on Oct. 14, 2003.

(51) Int. Cl.
*G08C 15/00* (2006.01)
(52) U.S. Cl. ............... 370/230; 370/235; 370/329; 370/341; 370/394; 370/395.2; 709/228
(58) Field of Classification Search ............ 370/227, 370/228, 238, 310, 329, 331, 338, 341, 349, 370/412, 413, 415, 417, 431, 437, 462
See application file for complete search history.

(56) References Cited

U.S. PATENT DOCUMENTS

| | | | | | |
|---|---|---|---|---|---|
| 4,524,440 | A | * | 6/1985 | Orsic | 370/360 |
| 4,780,870 | A | * | 10/1988 | McHarg et al. | 370/415 |
| 5,359,592 | A | | 10/1994 | Corbalis et al. | 370/233 |
| 5,732,078 | A | * | 3/1998 | Arango | 370/355 |
| 6,292,839 | B1 | * | 9/2001 | Naudus et al. | 709/238 |
| 6,493,666 | B2 | * | 12/2002 | Wiese, Jr. | 704/230 |
| 6,507,567 | B1 | * | 1/2003 | Willars | 370/321 |
| 6,574,770 | B1 | | 6/2003 | Daudelin | 714/776 |
| 6,577,610 | B1 | | 6/2003 | Kronz | 370/322 |
| 6,625,117 | B1 | * | 9/2003 | Chen et al. | 370/227 |
| 6,931,026 | B1 | * | 8/2005 | Lee et al. | 370/468 |
| 6,934,275 | B1 | | 8/2005 | Love et al. | 370/342 |
| 2002/0059612 | A1 | * | 5/2002 | Kita | 725/64 |

(Continued)

FOREIGN PATENT DOCUMENTS

JP 2001-338389 7/2001

(Continued)

OTHER PUBLICATIONS

International Search Report—PCT/US04/033679, International Search Authority—European Patent Office—Jan. 11, 2005.

(Continued)

*Primary Examiner*—Chi H. Pham
*Assistant Examiner*—Shick Hom
(74) *Attorney, Agent, or Firm*—Eric Ho

(57) ABSTRACT

This disclosure provides a method and apparatus for the communication of low delay data over multiple channels having different speed and latency and requiring a different amount of time to set up. In one embodiment, the transmitter removes duplicate data packets from a queue after a second channel, such as a dedicated channel is established. In an alternate embodiment, sequence numbers are assigned to data packets, allowing the receiver to identify duplicate packets and ignore the duplicates.

34 Claims, 15 Drawing Sheets

U.S. PATENT DOCUMENTS

| | | | |
|---|---|---|---|
| 2002/0145985 A1* | 10/2002 | Love et al. | 370/328 |
| 2003/0012217 A1* | 1/2003 | Andersson et al. | 370/437 |
| 2003/0013454 A1* | 1/2003 | Hunzinger | 455/452 |
| 2003/0026205 A1* | 2/2003 | Mullendore et al. | 370/230 |
| 2004/0017795 A1* | 1/2004 | Abraham et al. | 370/348 |
| 2004/0136347 A1* | 7/2004 | Fuke et al. | 370/338 |

FOREIGN PATENT DOCUMENTS

| | | |
|---|---|---|
| JP | 2002-335556 | 11/2002 |
| RU | 2103822 | 1/1998 |
| WO | 0105098 | 1/2001 |
| WO | 0245327 | 6/2002 |

OTHER PUBLICATIONS

TIA/EIA/IS-856, "cdma2000 High Rate Packet Data Air Interface Specification", Nov. 2000.

Written Opinion, PCT/US2004/033679, International Searching Authority, European Patent Office, Jan. 11, 2005.

International Preliminary Report on Patentability, PCT/US2004/033679, International Preliminary Examining Authority, United States, Apr. 7, 2007.

* cited by examiner

METHOD AND APPARATUS FOR DATA COMMUNICATIONS OVER MULTIPLE CHANNELS

CLAIM OF PRIORITY UNDER 35 U.S.C. §119

The present Application for patent claims priority to Provisional Application No. 60/511,275 entitled "METHOD AND APPARATUS FOR DATA COMMUNICATIONS OVER MULTIPLE CHANNELS" filed Oct. 14, 2003, and assigned to the assignee hereof and hereby expressly incorporated by reference herein.

BACKGROUND

1. Field

The present invention relates generally to data packet communications and more specifically to communications over multiple channels.

2. Background

Wireless communications systems for packet data transmissions typically have one channel type established between the transmitter and receiver at the time a packet is ready for transmission. This type of channel is used for signaling and control between the Base Station (BS) and Mobile Station (MS), but may also carry user or application data. This channel is usually slow as it is shared among several receivers, and transmissions thereon are designed to be received by receivers in the poorest channel conditions. This channel is called the common channel.

Wireless communications systems have another type of channel which is faster and more efficient which may be used primarily for user or application data. This is the preferred channel for sending data from transmitter to receiver. This type of channel needs to be set up before data may be sent across it. Since the set-up procedure takes time, a delay is introduced into the system. Either the transmitter or the receiver may initiate set up of the fast channel. This channel is called the dedicated channel.

Both types of channels have different attributes with respect to speed and latency. Multiple types of channels may be available for a communication link between the base station and a mobile user. Each type of channel may have different attributes with respect to speed, latency, robustness, capacity and other Quality of Service (QoS) objectives. When applications have various Quality of Service objectives and the communication system has multiple channels with different attributes, the question arises how to best transmit data over multiple channels. Specifically, an application may require low-delay data transmission when there is currently only a low speed channel readily available. Such application may require the speed capacity of a high speed channel; however, addition of a high speed channel typically incurs additional set up time.

There is, therefore, a need in the art for processing communications with multiple channels supporting differing attributes. There is further a need to provide communications of various quality of service applications using low speed and high speed channels, or other channels having differing attributes and characteristics.

SUMMARY

The embodiments disclosed herein address the above stated needs by providing a method and apparatus for the communication of low-delay data over multiple channels, each having different speed and latency characteristics, and each requiring a different amount of time to set up. This disclosure shows techniques and equipment to eliminate the problems of out-of-order and duplicate data packets at the receiver when data packets are sent by the transmitter over multiple channels having varying attributes, as well as avoiding other configuration and processing problems associated with multiple channel types.

BRIEF DESCRIPTION OF THE DRAWINGS

The features, objects, and advantages of the presently disclosed method and apparatus will become more apparent from the detailed description set forth below when taken in conjunction with the drawings.

DETAILED DESCRIPTION

Increasing demand for wireless data transmission and the expansion of services available via wireless communication technology have led to the development of specific data services. One such service is referred to as HDR. An example of an HDR type system is the one proposed in the "cdma2000 High Rate Packet Data Air Interface Specification" referred to as "the HAI specification" and as "TIA/EIA/IS-856."

An HDR subscriber station, referred to herein as an Access Terminal (AT), may be mobile or stationary, and may communicate with one or more HDR base stations, referred to herein as Modem Pool Transceivers (MPTs). An access terminal transmits and receives data packets through one or more modem pool transceivers to an HDR base station controller, referred to herein as a Modem Pool Controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
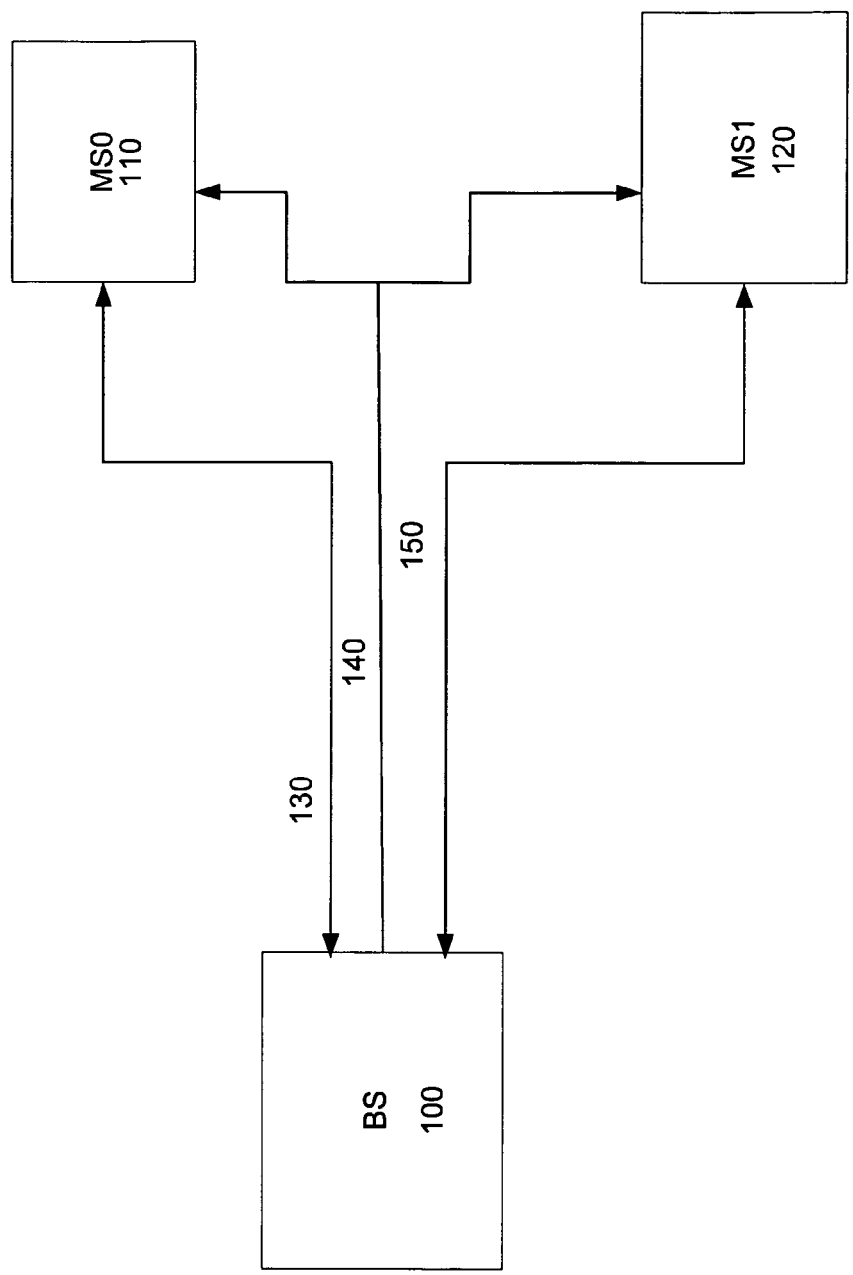
FIG. 1 is a block diagram of one embodiment of a High Data Rate (HDR) protocol wireless communication system.

FIG. 1 shows an embodiment of an HDR system for communications between BS 100 and multiple MSs 110 and 120. A common channel 140 exists between multiple MSs 110, 120 and one BS 100. A dedicated channel 130 exists between MS 110 and BS 100. Likewise a dedicated channel 150 exists between MS 120 and BS 100. A system may incorporate multiple common and dedicated channels in a wireless communication system. Both types of channels may be used for user data and control information between the base station and mobile station. This disclosure uses the HDR embodiments as an example. Other embodiments may include any system with multiple channels between a transmitter and a receiver. Further, the term channel may apply to channels separated by using frequencies, codes, time, or space. Further a channel may be shared among users as is the case with a common channel.

In HDR, an example of a common channel on the Forward Link (FL) for communication from base station to mobile station is the "control channel." On the Reverse Link (RL) from mobile station to base station, an example of a common channel is the "access channel." Examples of dedicated channels are the forward and reverse traffic channels.

Figure 2:
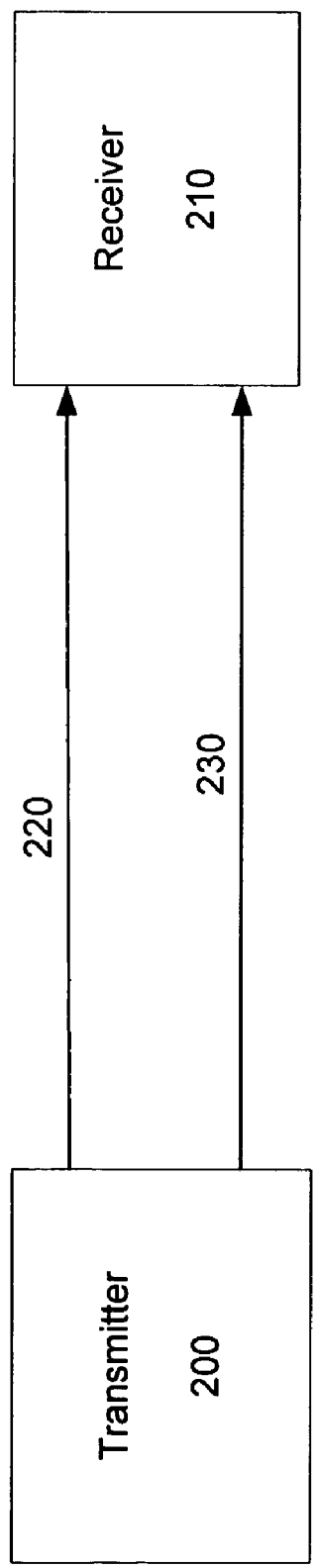
FIG. 2 is a system model for communications over multiple channels.

FIG. 2 is a system model of a communication system with multiple channels between the transmitter 200 and the receiver 210. Channel 220 and channel 230 each have different set-up and transmission attributes. This model allows for the ideas in this disclosure to apply to both the FL, wherein transmitter 200 is a BS and receiver 210 is a MS, and to the RL, wherein transmitter 200 is a MS and receiver 210 is a BS.

Specifically, common channel 220 already exists between the transmitter 200 and receiver 210 when a packet is ready for transmission. However, common channel 220 is slower than dedicated channel 230 because it is shared among several receivers, and because the transmissions on common channel 220 are designed to be received by receivers in the poorest channel conditions. In addition, less data is sent on common channel 220 since it operates at a lower data rate.

To conserve power, receivers may choose not to monitor common channel 330 all the time and only wake up at certain times to verify if data is available, wherein if there is no data available, the receiver returns to a sleep mode.

Figure 3:
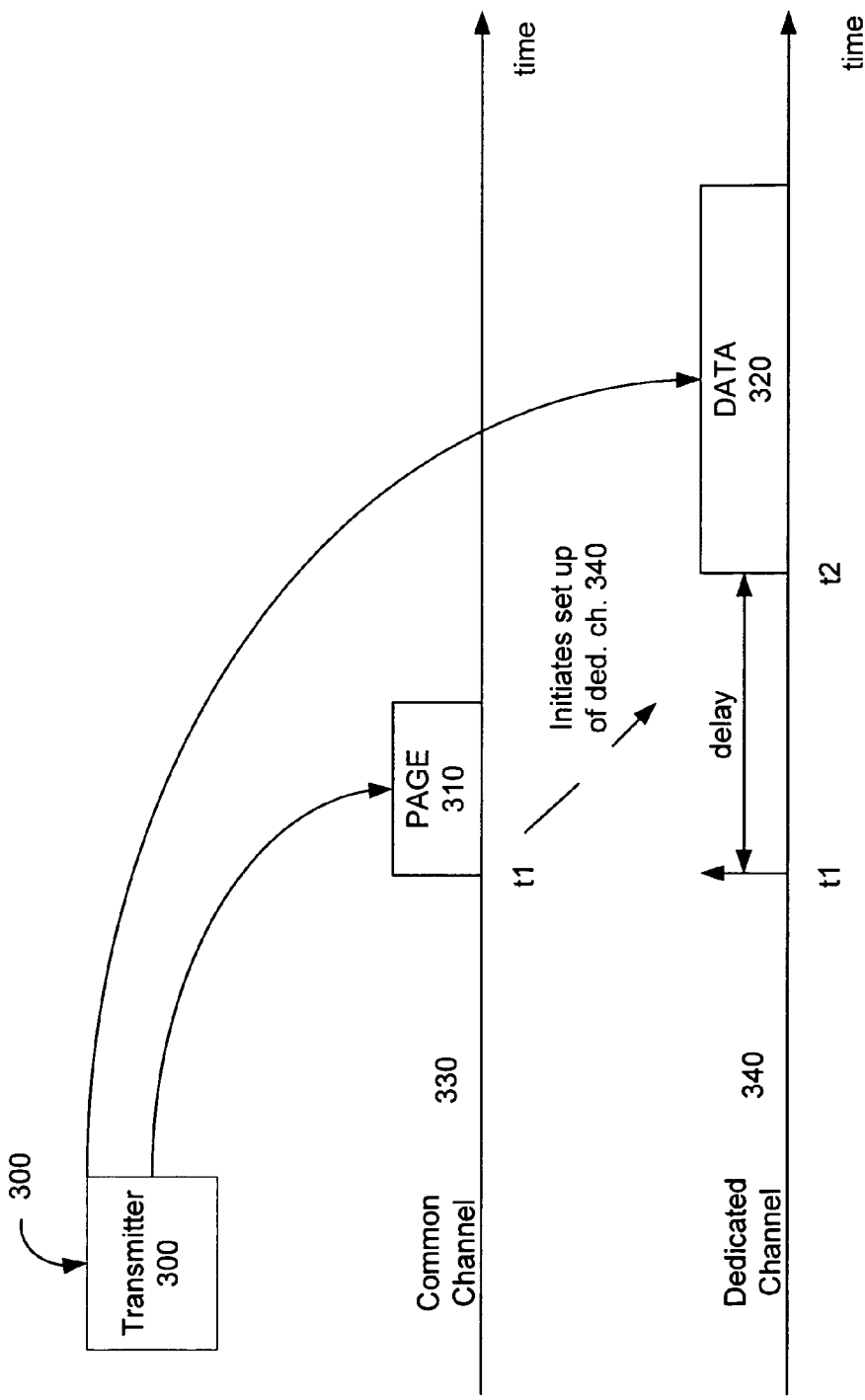
FIG. 3 is a diagram showing packet data communications sent over multiple channels.

FIG. 3 illustrates transmission of data on a common channel 330 and on a dedicated channel 340. As illustrated, a page message is sent from the transmitter 300 to initiate set up of the dedicated channel 340, incurring a time delay to complete the set up. Since the transmitter 300 knows when the receiver monitors common channel 330, transmitter 300 sends the page at the appropriate time. If a page or data is sent to a receiver when the receiver (not shown) is not monitoring common channel 330, then the receiver will not receive the data and system resources are wasted.

Once the dedicated channel 340 is set up, data should be sent using this channel. The dedicated channel 340 is the more efficient, faster, higher capacity channel, and is preferred for user or application data. Further, if the user or application data is sent using both common channel 330 and dedicated channel 340 after the dedicated channel 340 has been established, then the relative ordering of data sent across the two channels needs to be maintained which increases the processing at the receiver. Moreover, once dedicated channel 340 is set up, the receiver continuously monitors dedicated channel 340. Therefore, dedicated channel 340 is the preferred channel for sending data from transmitter 300 to the receiver. However dedicated channel 340 is not always ready to use. Dedicated channel 340 needs to be set up before data may be sent across it. The set-up procedure takes time. Since common channel 330 is available all the time, it is used to set up dedicated channel 340. Either the transmitter 300 or the receiver may initiate set up of dedicated channel 340.

Under normal operation, when data arrives at the transmitter 300, the transmitter uses common channel 330 to send control messages or pages to the receiver in packet data 310 that cause the set-up of dedicated channel 340. Once dedicated channel 340 is set up, data is transferred to the receiver in packet data 320 using dedicated channel 340. The normal operation is sufficient for most applications which have delay tolerant data. The above description applies to forward link only. On the reverse link, the transmitter would send a Connection Request on the common Access Channel to set up the dedicated Traffic Channel.

As an example, transmitter 300 may transmit currently on the common channel 330, and therefore, sends the page message 310 at time t1. The transmitter 300 sends the page 310 on common channel 330 to initiate set up of the dedicated channel 340. In response, the receiver may send a connection request message, whereupon the transmitter 300 and receiver negotiate set up of the dedicated channel 340. After the set up delay, the transmitter 300 is able to send data on the dedicated channel 340, such as packet 320, at time t2.

Figure 4:
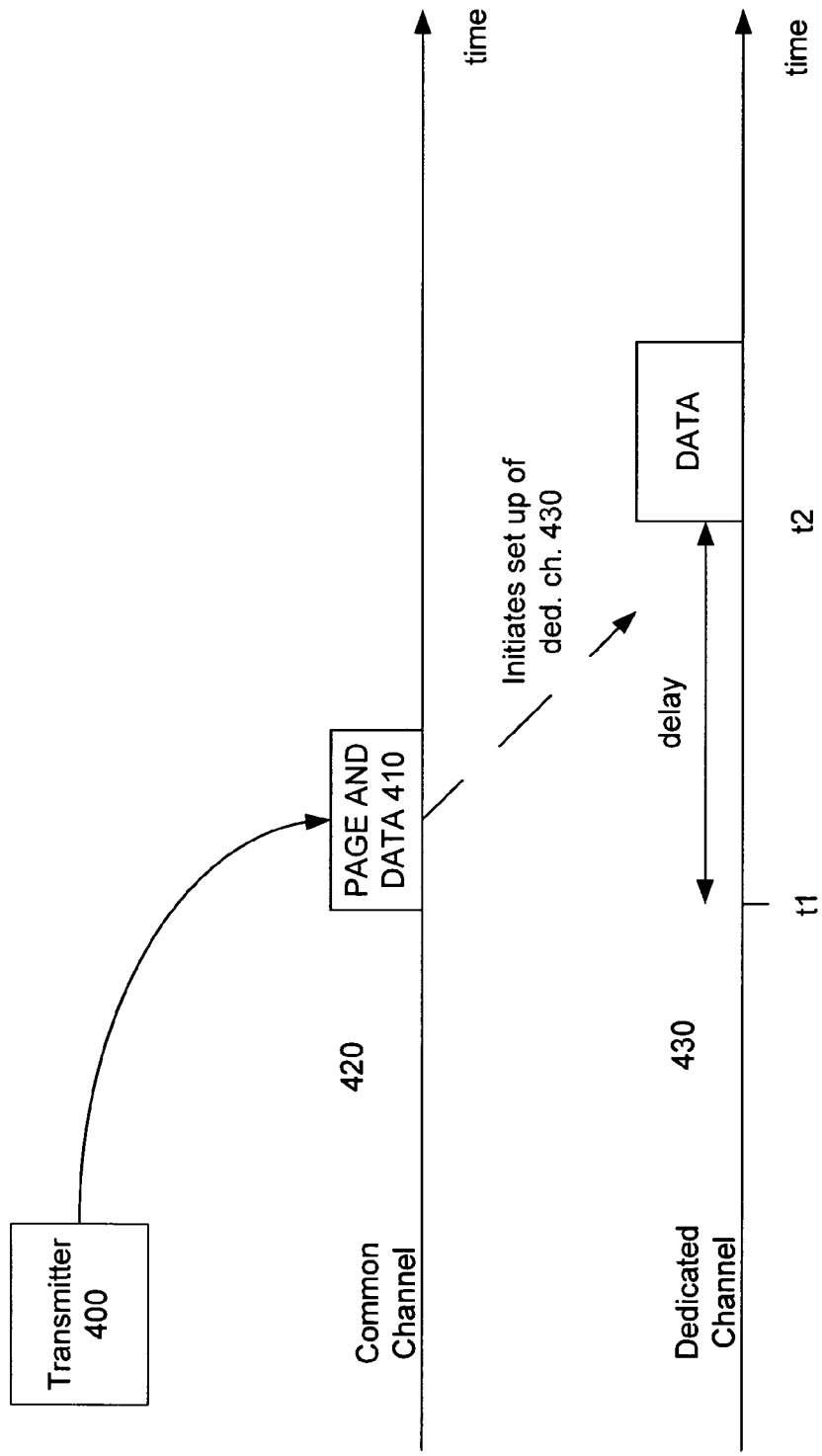
FIG. 4 is a diagram showing packet data communications sent over one channel.

A transmitter may be required to transmit time-sensitive data that needs to reach the receiver within a certain delay based on the application. As shown in FIG. 4, in the case of time-sensitive data, it is undesirable to wait for dedicated channel 430 to set up before the data is sent to the receiver. In this scenario, the transmitter 400 sends data on common channel 420 in packet data 410 and simultaneously initiates set-up of dedicated channel 430 (time t1). The control information to set-up dedicated channel 430 may be sent on common channel 420 or by any other available channel. This allows for early transmission of data. Once dedicated channel 430 is ready (time t2) data is sent on dedicated channel 430.

Figure 5:
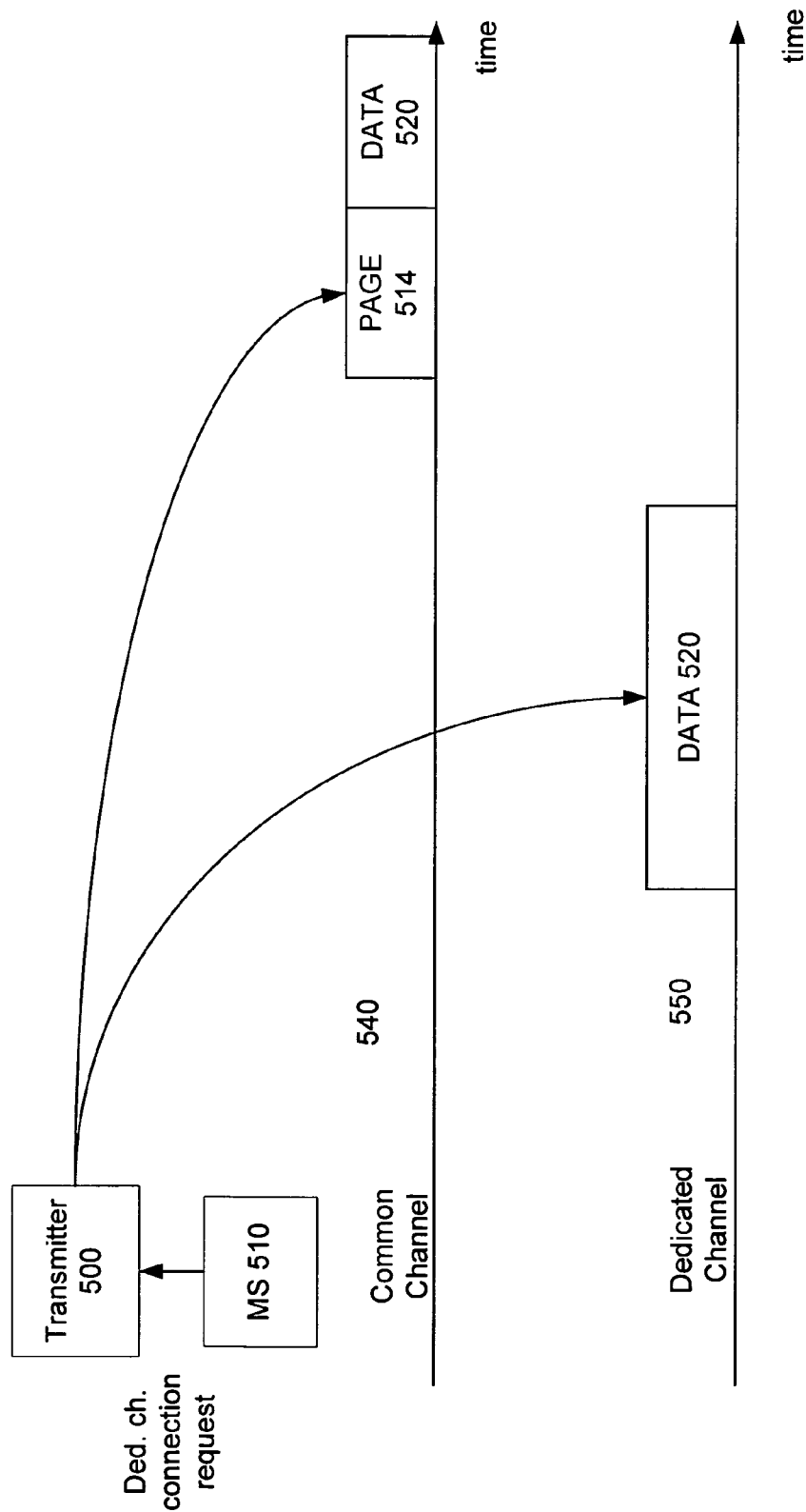
FIG. 5 is a diagram showing packet data communications over multiple channels where packets are received in duplicate after a MS sends a communication request.

FIG. 5 is a block diagram showing packet data communications over multiple channels after a MS 510 sends a communication request to transmitter 500. As shown in FIG. 5, once the MS 510 requests connection and, in response dedicated channel 550 is established, the transmitter 500 starts sending further data in packet data 520 using dedicated channel 550, which is the more efficient channel. However, one problem that occurs is that duplicate packet data 520 gets sent on both channels 540 and 550 because packet data 520 was already scheduled to be sent on common channel 540.

FIG. 5 illustrates the possibility of receiving duplicate data. That is, packet data 520 may be queued for transmission on dedicated channel 550. Packet data 520 would be scheduled for transmission once the dedicated channel 550 is established. Packet data 520 is also sent on common channel 540 with page 514. This provides the potential for a low delay transmission on common channel 540, while maintaining the correct sequence order on dedicated channel 550. However, such a method causes the problem of duplicate packets at the receiver since the packet data was already scheduled on the common channel, which may also cause additional delay, for many applications.

Figure 6:
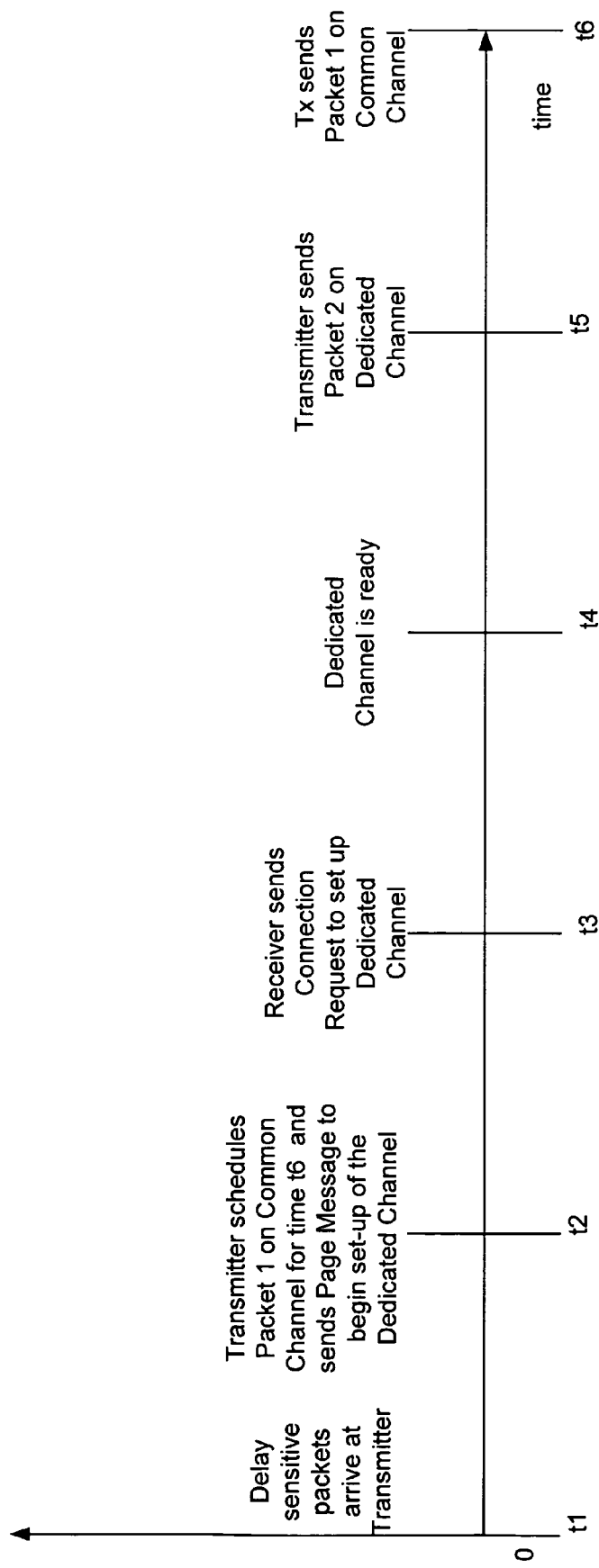
FIG. 6 is a timeline showing packet data communications over multiple channels where packets are received out-of-order.

FIG. 6 is a timeline illustrating out-of-order packet transmission. Time sensitive data, i.e., delay sensitive data, arrives at the transmitter at time t1. At time t2, the transmitter schedules Packet 1 to be transmitted on the common channel at time t6, and also sends control messages to begin set up of the dedicated channel. As described above, Packet 1 may be sent to the receiver at the next opportunity when the receiver monitors the common channel. At time t3, the receiver wakes up, requests a connection, and initiates set-up of the dedicated channel. At time t4, the dedicated channel is ready; note, this is before the data is transmitted on the common channel. After set up of the dedicated channel, the transmitter sends the next packet, Packet 2, at time t5, on the dedicated channel. Packet 2, sent on the dedicated channel, arrives at the receiver before Packet 1 is sent on the common channel at time t6 (as scheduled by the transmitter at time t1). The data thus arrives at the receiver out-of-order. This scenario is shown in the timeline of FIG. 6, using messages consistent with the HDR standard as an example. The reception of the packets out-of-order is a problem for many applications. For example an out-of-order packet in a streaming audio or video application may result in a distortion of the sound or image, respectively. In addition, duplicate packet data increases delay time.

Figure 7:
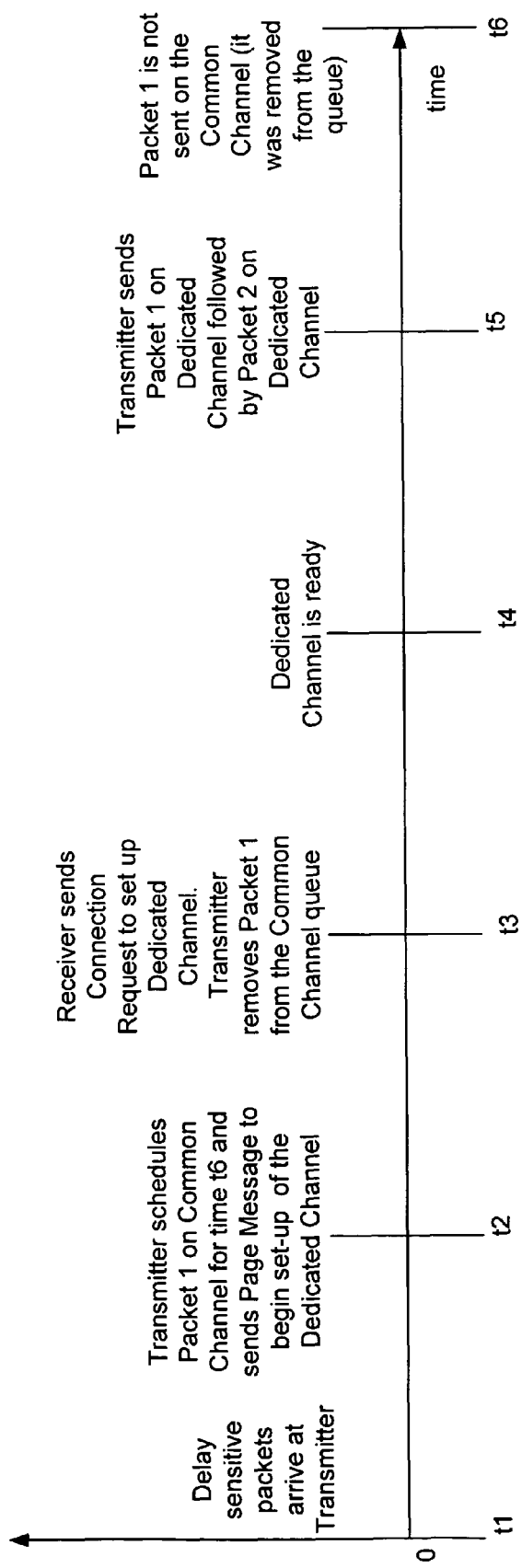
FIG. 7 is a timeline showing packet data communications over multiple channels where a packet is removed from the queue of one channel when another channel becomes available.

FIG. 7 is a timeline for one method of eliminating out-of-order or duplicate packets. Delay sensitive data arrives at the transmitter at time t1. At time t2 the transmitter schedules the transmission of Packet 1 for time t6, on the common channel and also initiates the procedure to set up the dedicated channel. Again the receiver sends a connection request to the transmitter to initiate set up of a dedicated channel. The transmitter then removes Packet 1 from the common channel queue if the dedicated channel will be ready to use before Packet 1 is scheduled for transmission on the common channel at time t6. At time t5, Packet 1 is sent on the dedicated channel which has been established. According to this procedure, the transmitter calculates the timing, and removes Packet 1 from the queue of the common channel when appropriate.

Alternately, if the transmitter knows the time it will take to establish the dedicated channel (e.g., time until the dedicated channel is ready for data), the transmitter may determine when the receiver will receive Packet 1, and thereby remove Packet 1 from the queue of the common channel to avoid duplication.

According to the embodiment illustrated in FIG. 7, the transmitter first determines a set-up time for the dedicated channel. Setting up the dedicated channel requires some communication and negotiation between the BS and MS using an already established channel such as the common channel, and therefore may be difficult to predict. Hence, the transmitter may have difficulty deciding whether to remove Packet 1 from the common channel queue to prevent duplicate or out of order transmission.

Additionally, once the transmitter calculates the set-up time and decides to remove a packet from the common channel queue, the transmitter may have difficulty removing a packet. This could happen, for instance, if the transmitter is comprised of two entities, a Base Station Controller (BSC), which builds packets and queues them, and a Base Transceiver System (BTS) which maintains the queue and transmits the packet. Since the BSC has already communicated to the BTS to transmit the packet data, it may not be possible to cancel the schedule.

Figure 9:
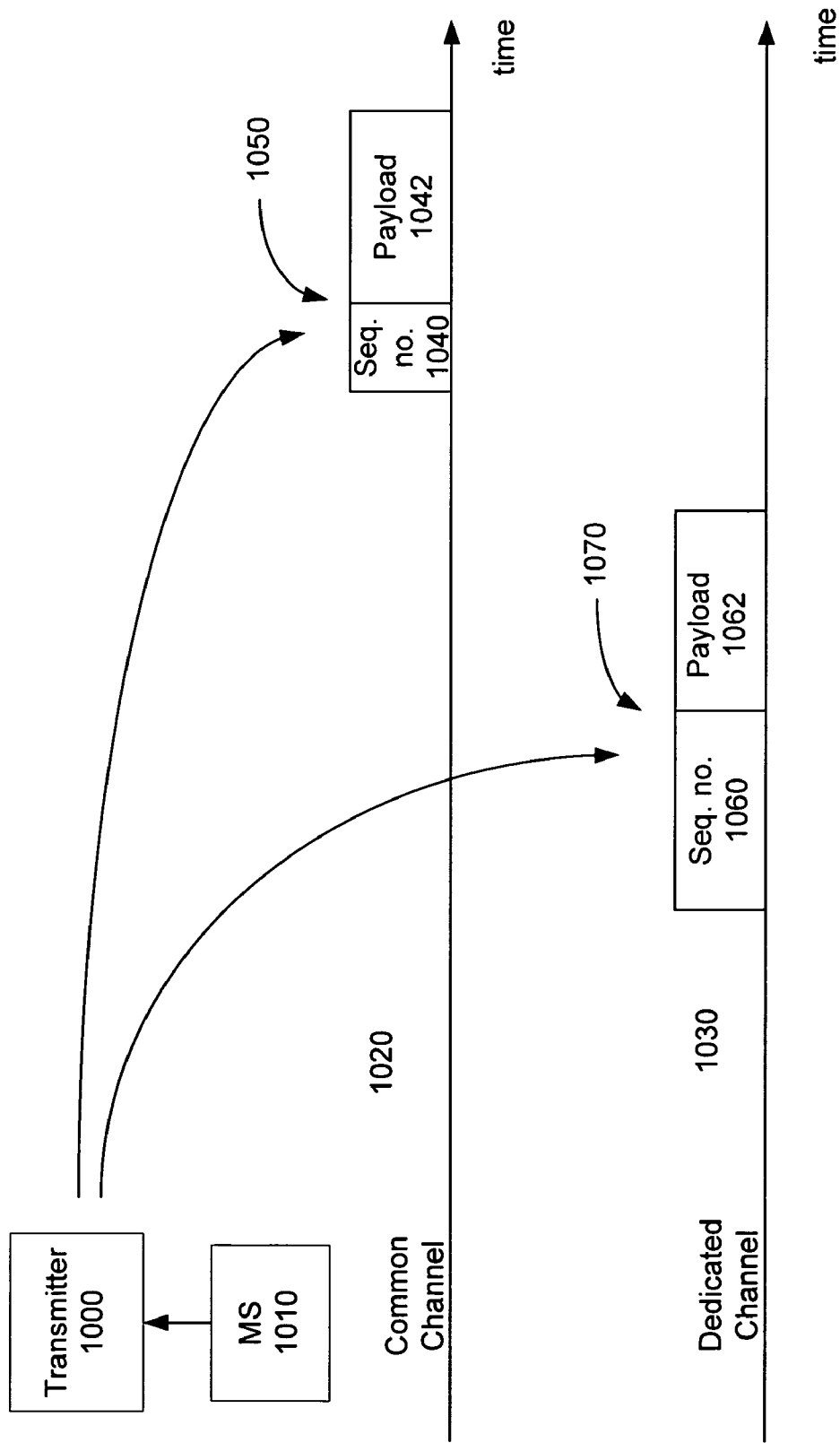
FIG. 9 is a diagram showing packet data communications in a DOSP where a payload on the common channel is discarded.
Figure 10:
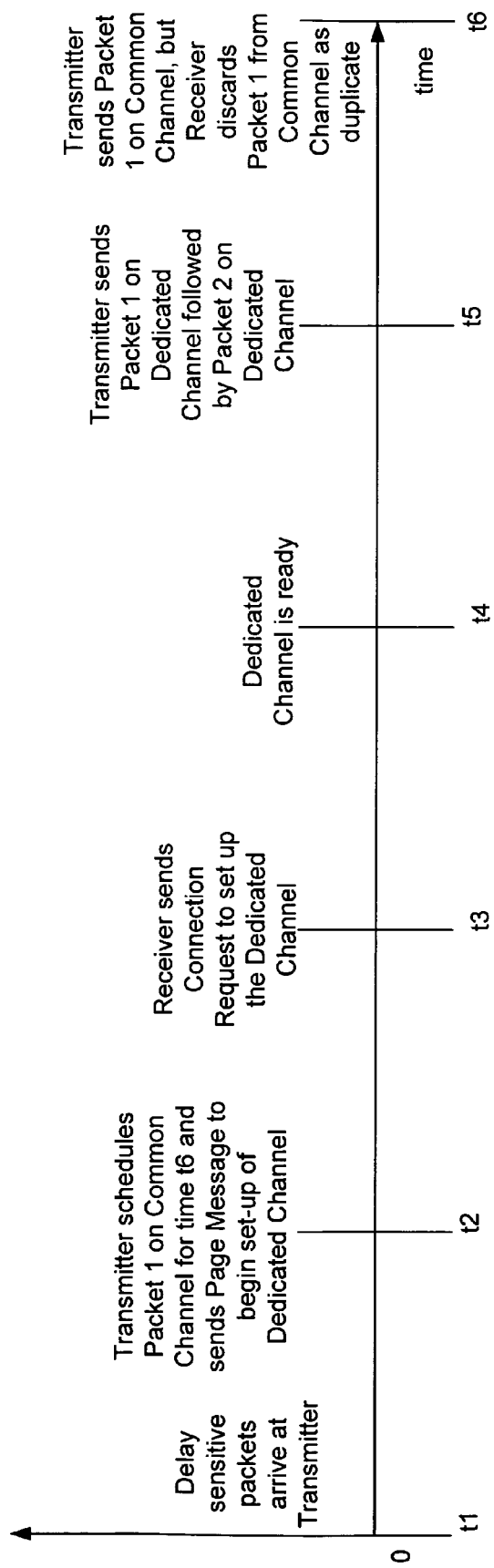
FIG. 10 is a timeline showing packet data communications over multiple channels where a duplicate packet is detected and removed by the receiver.

According to another embodiment that circumvents these two problems, the transmitter uses sequence numbers to identify the packets, as illustrated in FIG. 9. For example, Packet 1 1050 carries sequence number 1, transmitted as sequence number 1040. Packet 1 1050 is transmitted on common channel 1020 as payload 1042 with sequence number 1040. Packet 2 1070 carries sequence number 2, transmitted as sequence number 1060. Packet 2 1070 is transmitted on dedicated channel 1030 as payload 1062 and sequence number 1060. If the receiver initiates set up of dedicated channel 1030 while a packet is scheduled to be transmitted on common channel 1020, then, upon set up of dedicated channel 1030, the transmitter 1000 transmits Packet 1 1050 on the dedicated channel followed by Packet 2 1060. If the receiver receives Packet 1 1050 and/or Packet 2 1070 through both the common channel 1020 and dedicated channel 1030, the receiver would discard the later arrival as a duplicate based on the sequence number. In this case, the packets arrive in order at the receiver and duplicates are discarded using the sequence numbers. This method also allows reordering at the receiver. FIG. 10, which is a timeline for this procedure, shows packet data communications over multiple channels where a duplicate packet is detected and removed by the receiver.

With respect to FIG. 10, delay sensitive packets arrive at the transmitter at time t1. At time t2, the transmitter schedules Packet 1 to be transmitted on the common channel at time t6. At time t3, the receiver sends a connection request to set up the dedicated channel, whereupon the dedicated channel is ready for data at time t4. The transmitter sends (and the receiver then receives) Packet 1 using the dedicated channel followed by Packet 2 using the dedicated channel at time t5. Finally, at time t6, the transmitter sends (and the receiver then receives) Packet 1 using the common channel at time t6, whereupon, the receiver discards Packet 1 on the common channel as a duplicate.

Figure 11:
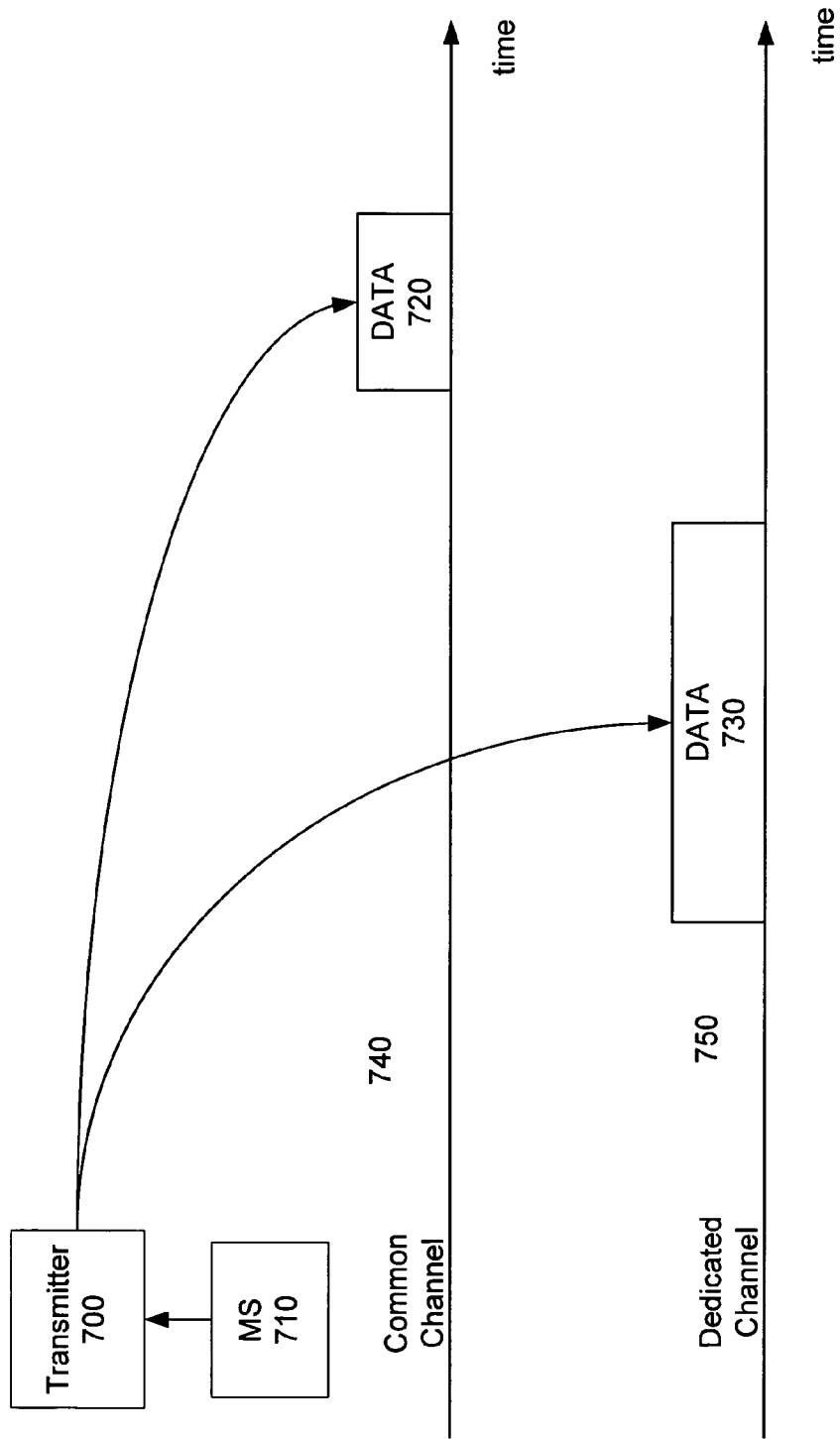
FIG. 11 is a diagram showing packet data communications over multiple channels where a duplicate packet is detected and removed by the receiver.

In FIG. 11, MS 710 sends a connection request to transmitter 700, and in response, dedicated channel 750 is established. In this scenario, the MS 710 will discard packet data 720 on common channel 740 because it is a duplicate of packet data 730 on dedicated channel 750. Both packet data have the same sequence number but not necessarily the same data. The MS 710 is able to detect duplicate packet data since both packet data have the same sequence number.

Figure 12:
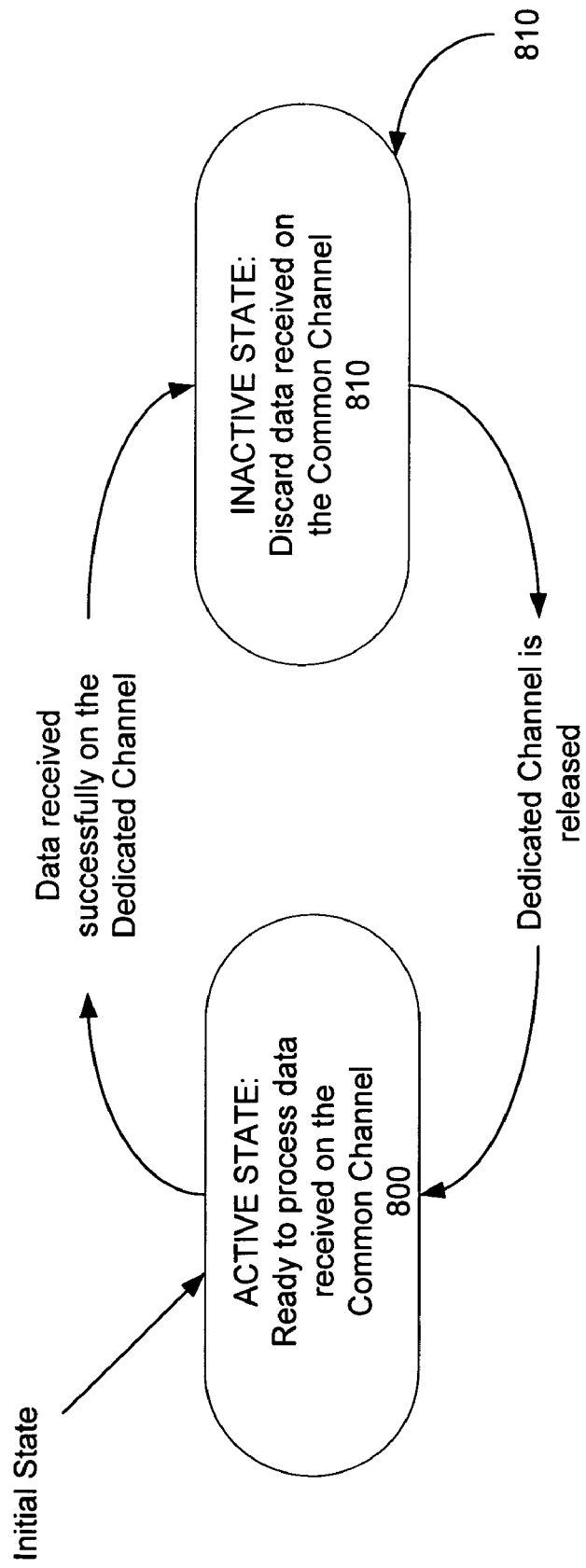
FIG. 12 is a receiver state diagram for receiver handling of data on the common channel.

In another embodiment, FIG. 12 illustrates a state diagram for receiver handling of data on the common channel. Initially the receiver processes data received on the common channel in state 800. At state 800 the receiver is ready to process data on the common channel. Upon receipt of data on the dedicated channel, and once data is successfully processed on the dedicated channel, the receiver transitions to state 810 whereupon data received on the common channel is discarded. The receiver continues to ignore the common channel data as long as the dedicated channel is available. When the dedicated channel is released, the receiver transitions to state 800 and resumes processing data received on the common channel. Once the dedicated channel is set up to receive packet data, the receiver ignores the data on the common channel. When the dedicated channel is released and not receiving any data, it will not ignore the common channel and will be ready to process its data.

Figure 13:
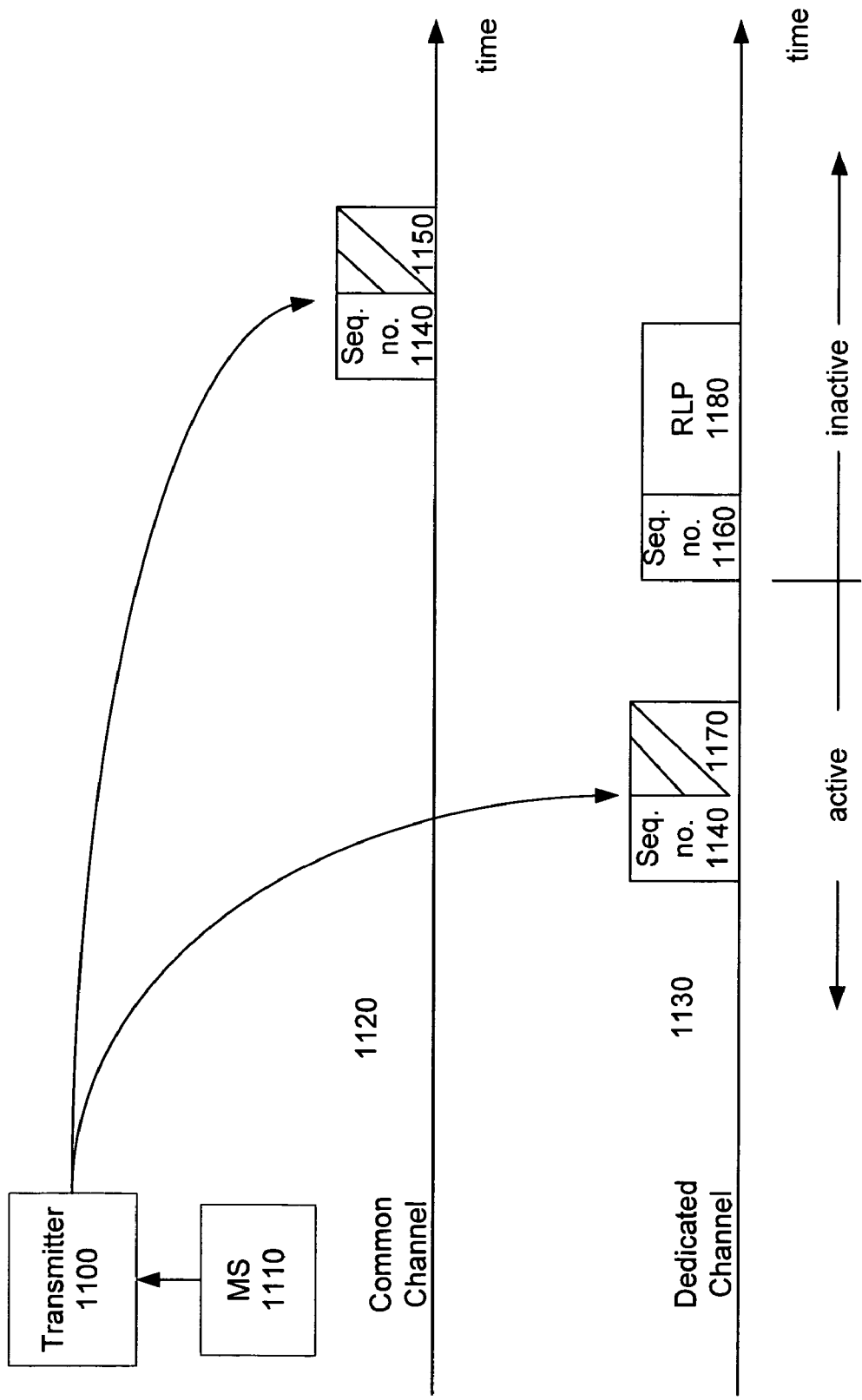
FIG. 13 is a diagram showing packet data communications in a typical DOSP.

In a particular embodiment, as illustrated in FIG. 13, the DOSP is the name given to a protocol which provides transmission and duplicate detection of higher layer packets using a signaling messages when communicating in a system using multiple channels such as common channel 1120 and dedicated channel 1130. A higher layer packet, a packet that is higher than the radio layer packet, is carried in a DOSP message. This corresponds to the data that is transported over common channel 1120. Common channel 1120 is typically used for signaling but in the case of a DOSP message sent over the common channel, the message carries data for a higher layer. The DOSP also uses message sequence number 1140 in the DOSP message to provide duplicate detection.

The Protocol Data Unit or transmission unit of this protocol is a DOSP message. The DOSP message also carries payload 1150 and 1170 on behalf of the higher layer.

Figure 8:
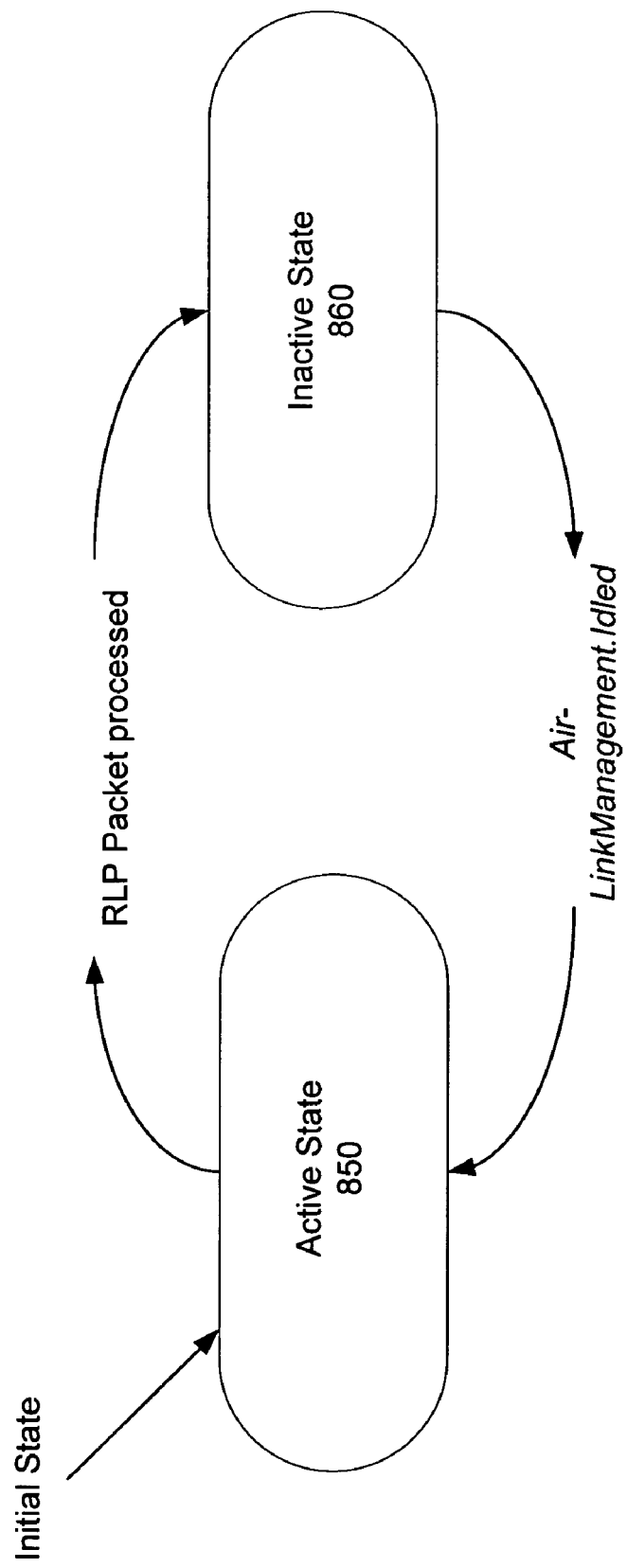
FIG. 8 is a receiver state diagram in a Data Over Signaling Protocol (DOSP).

As illustrated in FIG. 8, the DOSP may be in one of two states the InActive State 860 and the Active State 850. Upon receiving a Data Over Signaling message, the receiver shall validate the message. The receiver shall discard the Data Over Signaling message if it is invalid. The receiver shall pass the Higher Layer Packet field of the Data Over Signaling message to the higher layer if the message is valid. Upon processing a received RLP packet, the receiver shall transition to the Inactive State 860. If the protocol receives an Air-LinkManagement.Idled indication, then the access terminal and the access network shall transition to the Active State 850. The receiver shall discard received Data Over Signaling messages.

FIG. 13 illustrates packet data communications using a DOSP format, wherein a payload in the common channel is discarded. With respect to FIG. 13, the Active state is the state where messages received on common channel 1120, such as DataOverSignaling messages 1150, are processed by the receiver. The receiver transitions to the InActive State after it processes a Radio Link Protocol (RLP) message 1180 sent on dedicated channel 1130. RLP messages are used to transport higher level data on a traffic channel over in a wireless communications system. RLP 1180 has a sequence number 1160. If the receiver detects the sequence number 1160 being equal to the sequence number 1140, then it will discard the DOSP message 1150 on the control channel 1120. That is, the receiver continues to process RLP messages and discards the payload of DOSP message 1150 while it is in the InActive State.

The sender sets the MessageSequence field of a DOSP message 1150 to V(S). V(S) is a counter maintained at the sender to provide message sequencing. Each time the sender sends a DOSP message 1150, the sender increments the value of V(S).

As shown in FIG. 13, the out-of-order and duplicate packet problem is avoided because packets queued and potentially transmitted on common channel 1120 use the DOSP 1150 which has the same sequence number space from the RLP packets 1180 sent on dedicated channel 1130. Once dedicated channel 1130 becomes available, the packets queued and potentially transmitted on common channel 1120 are transmitted on dedicated channel 1130 also using the DOSP message 1150. After these packets are resent on dedicated channel 1130, the rest of the packets in the message are sent using RLP with payload 1180. Because the packets queued on common channel 1120 and requeued on dedicated channel 1130 have the same sequence number, the receiver may easily detect duplicate and out-of-order packets.

In another embodiment, in the Active State, upon receiving a DOSP message 1150, the receiver validates the message. The receiver discards the payload of the DOSP message 1150 since it has received an RLP packet with payload 1180 on dedicated channel 1130. The receiver passes the HigherLayerPacket field of the DOSP message to the higher layer if the message is valid.

Upon processing a received RLP packet, the receiver transitions to the InActive State. The receiver discards received DOSP messages 1150 when it is in the InActive State.

In the InActive State if the protocol receives an Air-LinkManagement.Idled indication, then the access terminal and the access network transitions to the Active state where it processes DOSP messages.

As described above, the BS or the MS sends the DOSP message to transmit a higher layer packet. The following table shows an example of the format of a DOSP message in this particular embodiment.

TABLE 1

| Field | Length (bits) |
| --- | --- |
| MessageID | 8 |
| MessageSequence | 8 |
| HigherLayerPacket | Variable Length |

MessageID: The sender sets this field to 0x14. This parameter identifies the particular DOSP message.

MessageSequence: The sender sets this field to 1 higher than the MessageSequence field of the last DOSP message (modulo 256) that it has sent. This parameter corresponds to the sequence number.

HigherLayerPacket: The sender sets this field to an entire higher layer packet. For example, if the higher layer packet is a High Level Data Link Control (HDLC) frame, then the entire HDLC frame is included. The length of the higher layer packet may be an integer number of octets. The sender assigns message priority in the range of 20 to 50, inclusive, depending on the priority of the higher layer packet carried as payload in this message. This parameter corresponds to the data being sent over a channel.

Figure 14:
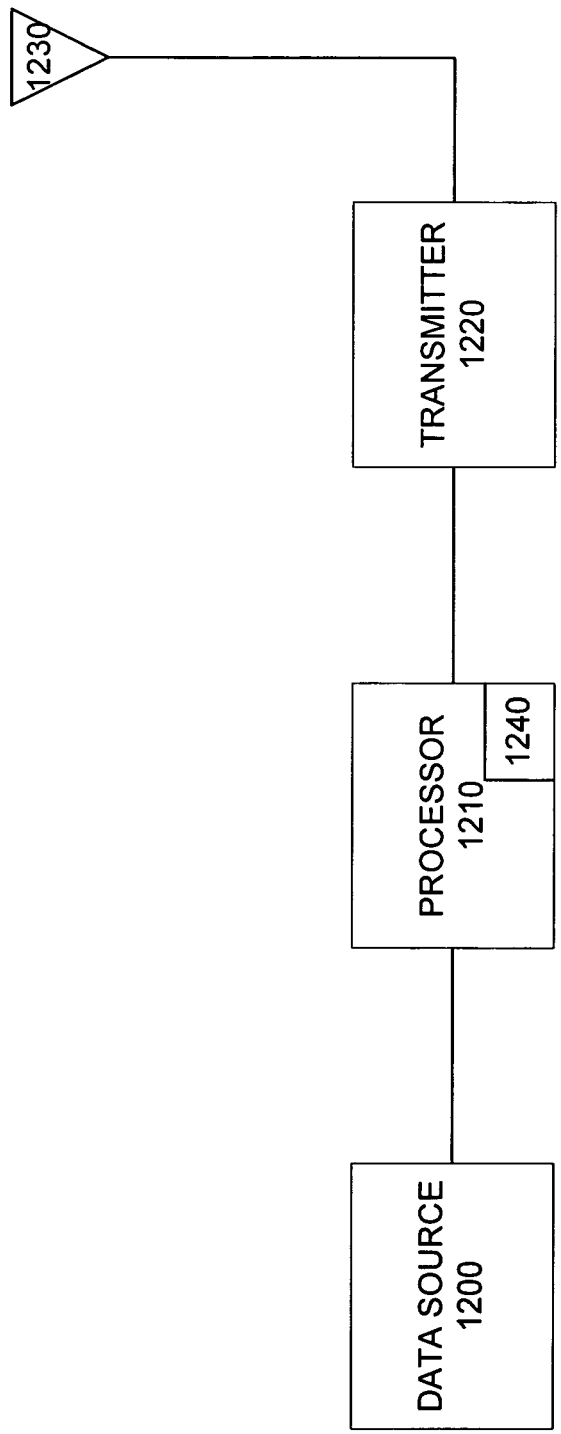
FIG. 14 is a block diagram of an embodiment of a transmitter apparatus.

FIG. 14 is a block diagram of an embodiment of a transmitter apparatus. Data source 1200 is any application which provides data transmission. The processor 1210 provides the queuing, formatting, and sequencing functions of the embodiments described in this disclosure. The processor 1210 also includes a scheduler 1240 for scheduling packet data transmission over a channel. The transmitter 1220 encompasses signal formatting and modulation necessary for transmission. Finally data packets are transmitted using the antenna 1230. Note that various functions may be distributed or shared by the blocks. For example, the queuing function may be distributed among both the processor and the transmitter. Further, the data source 1200, processor 1210, and transmitter 1220, may be combined into a smaller number of blocks or they may be broken up into multiple blocks.

Figure 15:
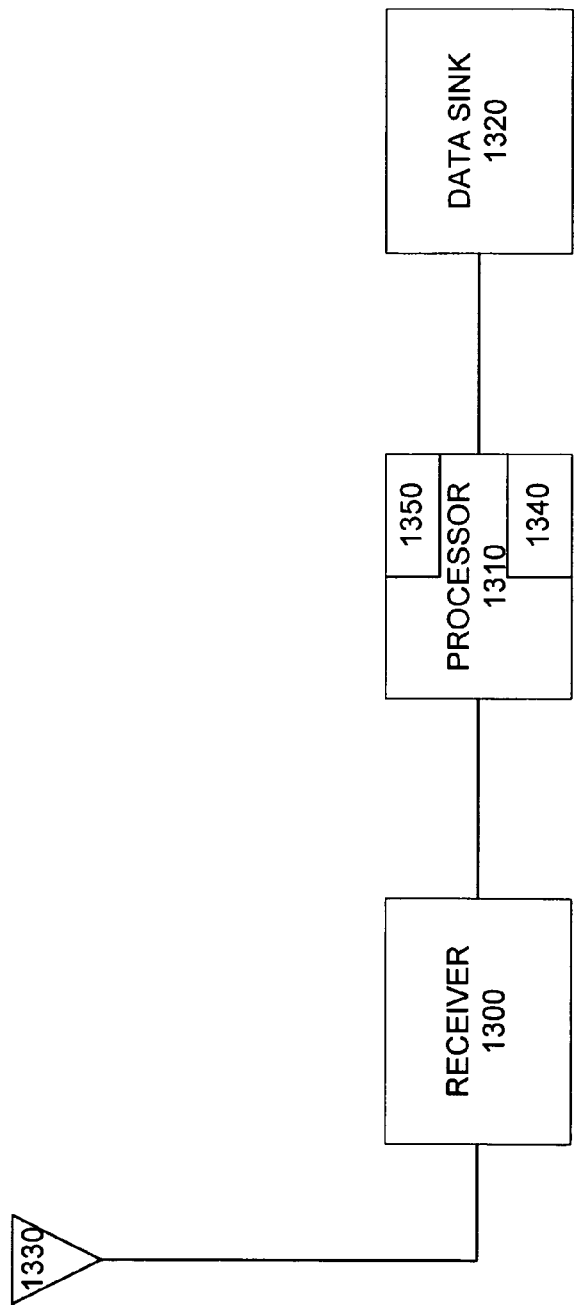
FIG. 15 is a block diagram of an embodiment of a receiver apparatus.

FIG. 15 is a block diagram of an embodiment of a receiver apparatus. The RF signal is received at antenna 1330. The receiver 1300 demodulates the signal and provides a symbol stream to the processor 1310. The processor 1310 decodes the symbol stream into bits and also provides the sequencing, deformatting, and multichannel reception functions described in this disclosure. The processor 1310 also includes a duplicate detection unit 1340 for detecting duplicate packet data and a DOSP state machine 1350 for detecting active and inactive states of the receiver as defined above. The data bit stream is provided to the data sink 1320 which may be an application requiring the data. Note that various functions may be distributed or shared by the blocks. The receiver 1300, processor 1310, and data sink 1320, may be combined into a smaller number of blocks or they may be broken up into a larger number of blocks.

Those of skill in the art would understand that various steps or elements in the embodiments may be altered or their order rearranged without varying from the invention that has been disclosed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal such as the MS or reside at the BS. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communication of data packets in a wireless communication system, comprising:
   queuing a first data packet for transmission over a first channel having a first characteristic;
   queuing a second data packet for transmission over a second channel having a second characteristic, wherein the first channel and the second channel are part of the same network;
   combining the first packet and a first sequence number into a first signaling message of a protocol that is different than a protocol of the first packet;
   transmitting the first signaling message over the first channel with a request to set up the second channel; and
   transmitting the second data packet over the second channel when the second channel is set up.

2. The method in claim 1, further comprising establishing the second channel.

3. The method in claim 1, wherein data packets arrive at a queuing device prior to establishment of the second channel.

4. The method in claim 1, wherein a sequence number is added to the second data packet.

5. The method in claim 1, further comprising removing the data packet from the queue at the first channel, wherein removing the data packet is based on duplicate detection.

6. The method in claim 5, wherein removing the first data packet is based on a Data Over Signaling Protocol (DOSP).

7. The method of claim 1, wherein the first channel is a common channel and the second channel is a dedicated channel.

8. The method of claim 7, wherein the first data packet is for a low-latency application.

9. The method of claim 7, wherein the second data packet is for an application having a quality of service consistent with the second channel.

10. The method of claim 1, wherein the second channel has a higher capacity than the first channel.

11. The method of claim 1, wherein the second channel is capable of transmission rates higher than the first channel.

12. A method for communication of data packets in a wireless communication system, comprising:
    receiving a first signaling message and with a request to set up a second channel over a first channel, wherein the first signaling message comprises a first data packet and a first sequence number and uses a different protocol than the first packet;
    receiving a second data packet on the second channel at a time subsequent to receiving the first signaling message, wherein the first channel and the second channel are part of the same network; and
    ignoring the first data packet in the first signaling message from a queue over the first channel if it arrives at a time subsequent to receiving the first data packet over the second channel.

13. The method in claim 12, further comprising sending a connection request to a transmitter to establish a second channel.

14. The method in claim 12, wherein ignoring the first data packet is based on duplicate detection.

15. The method in claim 12, wherein ignoring the first data packet is based on a Data Over Signaling Protocol (DOSP).

16. The method in claim 12, wherein the first data packet comprises packets arriving at a queuing device prior to establishment of the second channel.

17. The method of claim 12, wherein the first channel is a common channel and the second channel is a dedicated channel.

18. The method of claim 12, wherein the first data packet is for a low-latency application.

19. The method of claim 12, further comprising:
receiving a page on the first channel; and
in response to receiving the page, transmitting a connection request to establish the second channel.

20. The method of claim 12, wherein the second channel has a higher capacity than the first channel.

21. The method of claim 12, wherein the second channel is capable of transmission rates higher than the first channel.

22. An apparatus for communication of data packets comprising:
means for queuing a first data packet for transmission over a first channel;
means for queuing a second data packet for transmission over a second channel having a second characteristic, wherein the first channel and the second channel are part of the same network;
means for combining the first packet and a first sequence number into a first signaling message of a protocol that is different than a protocol of the first packet;
means for transmitting the first signaling message over the first channel with a request to set up the second channel; and
means for transmitting the second data packet over the second channel when the second channel is set up.

23. The apparatus in claim 22, further comprising a means for establishing the second channel.

24. The apparatus in claim 22, wherein a sequence number is added to the second data packet.

25. The apparatus in claim 22, further comprising means for removing the first data packet from the queue at the first channel, wherein the means for removing the data packet is based on duplicate detection.

26. The apparatus in claim 25, wherein the means for removing the first data packet is based on a Data Over Signaling Protocol (DOSP).

27. An apparatus for communication of data packets comprising:
means for receiving a first signaling message over a first channel with a request to set up a second channel, wherein the first signaling message comprises a first data packet and a first sequence number and uses a different protocol than the first packet;
means for receiving a second data packet on the second channel at a time subsequent to receiving the first signaling message, wherein the first channel and the second channel are part of the same network; and
means for ignoring the first data packet in the first signaling message from a queue over the first channel if it arrives at a time subsequent to receiving a first data packet over the second channel.

28. The apparatus in claim 27 further comprising a means for sending a connection request to a transmitter to establish a second channel.

29. The apparatus in claim 27, wherein the first data packet comprises packets arriving at a means for queuing the data packet prior to establishment of the second channel.

30. The apparatus in claim 27, wherein a sequence number is added to the first and second data packet.

31. The apparatus in claim 27, wherein the means for ignoring the first data packet is based on duplicate detection.

32. The apparatus in claim 27, wherein the means for ignoring the first data packet is based on a Data Over Signaling Protocol (DOSP).

33. A non-transitory computer readable storage medium storing a computer program for communication of data packets in a wireless communication system comprising:
code for queuing a first data packet for transmission over a first channel having a first characteristic;
code for queuing a second data packet for transmission over a second channel having a second characteristic, wherein the first channel and the second channel are part of the same network;
code for combining the first packet and a first sequence number into a first signaling message of a protocol that is different than a protocol of the first packet;
code for transmitting the first signaling message over the first channel with a request to set up the second channel; and
code for transmitting the second data packet over the second channel when the second channel is set up.

34. A non-transitory computer readable storage medium storing a computer program for communication of data packets in a wireless communication system comprising:
code for receiving a first signaling message with a request to set up a second channel over a first channel, wherein the first signaling message comprises a first data packet and a first sequence number and uses a different protocol than the first packet;
code for receiving a second data packet on the second channel at a time subsequent to receiving the first signaling message, wherein the first channel and the second channel are part of the same network; and
code for ignoring the first data packet from a queue over the first channel if it arrives at a time subsequent to receiving a first data packet over the second channel.

* * * * *